United States Patent
Gaucas (10) Patent No.: US 7,603,701 B2
(45) Date of Patent: Oct. 13, 2009

(54) TOOLS FOR ACCESS TO DATABASES VIA INTERNET PROTOCOL NETWORKS

(75) Inventor: Dale Ellen Gaucas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 810 days.

(21) Appl. No.: 11/173,774

(22) Filed: Jun. 30, 2005

(65) Prior Publication Data

US 2007/0005601 A1 Jan. 4, 2007

(51) Int. Cl.
H04L 9/32 (2006.01)
G06F 7/04 (2006.01)
G06F 15/16 (2006.01)
G06F 17/30 (2006.01)

(52) U.S. Cl. .................. 726/7; 713/155; 713/184
(58) Field of Classification Search .......... 713/155, 713/159, 184, 193; 726/7; 707/9
See application file for complete search history.

(56) References Cited

U.S. PATENT DOCUMENTS

| | | | | |
|---|---|---|---|---|
| 5,023,908 A * | 6/1991 | Weiss | | 713/184 |
| 5,168,520 A * | 12/1992 | Weiss | | 713/184 |
| 5,367,572 A * | 11/1994 | Weiss | | 713/184 |
| 6,073,106 A * | 6/2000 | Rozen et al. | | 705/3 |
| 6,397,224 B1 * | 5/2002 | Zubeldia et al. | | 707/102 |
| 6,628,767 B1 * | 9/2003 | Wellner et al. | | 379/202.01 |
| 7,039,628 B2 * | 5/2006 | Logan, Jr. | | 707/2 |
| 7,234,064 B2 * | 6/2007 | Menschik et al. | | 713/193 |
| 7,234,160 B2 * | 6/2007 | Vogel et al. | | 726/10 |
| 7,350,695 B2 * | 4/2008 | Piccirillo et al. | | 235/375 |
| 7,428,494 B2 * | 9/2008 | Hasan et al. | | 705/3 |
| 7,440,904 B2 * | 10/2008 | Hasan et al. | | 705/3 |
| 7,454,412 B2 * | 11/2008 | Diewald et al. | | 707/3 |
| 2002/0004727 A1 * | 1/2002 | Knaus et al. | | 705/3 |
| 2002/0016923 A1 * | 2/2002 | Knaus et al. | | 713/200 |
| 2002/0022973 A1 * | 2/2002 | Sun et al. | | 705/3 |
| 2002/0029157 A1 * | 3/2002 | Marchosky | | 705/3 |
| 2002/0035684 A1 * | 3/2002 | Vogel et al. | | 713/155 |
| 2002/0165759 A1 * | 11/2002 | Gruber et al. | | 705/10 |
| 2003/0005464 A1 * | 1/2003 | Gropper et al. | | 725/115 |
| 2003/0036683 A1 * | 2/2003 | Kehr et al. | | 600/300 |

(Continued)

OTHER PUBLICATIONS

"Health Plan Strategies for Managing Specialty Pharmacy Costs, A Jan. 20, 2005 Audioconference; HIPAA Compliance Strategies—How Are You Supposed to Verify a Patient's ID Over the Phone?" reprinted from the Jan. 2003 issue of Report on Patient Privacy. (at http://www.aishealth.com/Compliance/Hipaa/RP-PVerifyFamily.html).

Primary Examiner—David García Cervetti
(74) Attorney, Agent, or Firm—Miele Law Group PC (57) ABSTRACT

One embodiment is directed to apparatus. In the apparatus, a trusted intermediary computer screen user interface is provided. An identification information input receives, via the computer screen user interface, information identifying an authorized information seeker. The information seeker seeks access to a remote database via an internet protocol connection. An authorization confirmation display displays, via the computer screen user interface, that the authorized information seeker is confirmed as authorized to access the remote database. An access code request input requests, via the computer screen user interface, an access code for use by the authorized information seeker to access the remote database via the internet protocol connection. An access code output outputs the access code for use by the authorized information seeker.

23 Claims, 5 Drawing Sheets

U.S. PATENT DOCUMENTS

| | | | |
|---|---|---|---|
| 2003/0046114 A1* | 3/2003 | Davies et al. | 705/3 |
| 2003/0055684 A1* | 3/2003 | Jaskolski et al. | 705/3 |
| 2003/0073124 A1* | 4/2003 | Bowman et al. | 435/6 |
| 2003/0126088 A1* | 7/2003 | Mineyama | 705/51 |
| 2003/0137536 A1* | 7/2003 | Hugh | 345/744 |
| 2003/0140044 A1* | 7/2003 | Mok et al. | 707/10 |
| 2003/0177028 A1* | 9/2003 | Cooper et al. | 705/1 |
| 2003/0200118 A1* | 10/2003 | Lee et al. | 705/2 |
| 2003/0216940 A1* | 11/2003 | Sobel | 705/2 |
| 2004/0034550 A1* | 2/2004 | Menschik et al. | 705/3 |
| 2004/0064343 A1* | 4/2004 | Korpman et al. | 705/2 |
| 2004/0128163 A1* | 7/2004 | Goodman et al. | 705/2 |
| 2004/0130446 A1* | 7/2004 | Chen et al. | 340/539.12 |
| 2004/0187082 A1* | 9/2004 | Hathaway | 715/531 |
| 2004/0254816 A1* | 12/2004 | Myers | 705/2 |
| 2005/0027995 A1* | 2/2005 | Menschik et al. | 713/193 |
| 2005/0065815 A1* | 3/2005 | Mazar et al. | 705/2 |
| 2005/0188853 A1* | 9/2005 | Scannell, Jr. | 96/417 |
| 2005/0240613 A1* | 10/2005 | Logan, Jr. | 707/102 |
| 2005/0261942 A1* | 11/2005 | Wheeler | 705/3 |
| 2006/0195340 A1* | 8/2006 | Smitherman et al. | 705/2 |
| 2006/0229911 A1* | 10/2006 | Gropper et al. | 705/2 |
| 2006/0229919 A1* | 10/2006 | Pugh | 705/3 |
| 2006/0247968 A1* | 11/2006 | Kadry | 705/14 |
| 2006/0265508 A1* | 11/2006 | Angel et al. | 709/230 |
| 2006/0283936 A1* | 12/2006 | Piccirillo et al. | 235/381 |
| 2007/0011029 A1* | 1/2007 | Benson et al. | 705/3 |
| 2007/0027715 A1* | 2/2007 | Gropper et al. | 705/2 |
| 2008/0031455 A1* | 2/2008 | Piccirillo et al. | 380/277 |
| 2008/0052113 A1* | 2/2008 | Cauley et al. | 705/2 |

* cited by examiner

TOOLS FOR ACCESS TO DATABASES VIA INTERNET PROTOCOL NETWORKS

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

Aspects of the present disclosure relate to tools for secure remote access to information over Internet protocol networks.

BACKGROUND

Sensitive data may be stored in various types of guarded databases, while a custodian is responsible for populating, updating, and guarding access to the sensitive data. Meanwhile, an information seeker may desire access to the sensitive data, and may be authorized to obtain such access. There is a need for tools to make it easier for information seekers to remotely access guarded databases.

SUMMARY OF THE DISCLOSURE

One embodiment is directed to apparatus. In the apparatus, a trusted intermediary computer screen user interface is provided. An identification information input receives, via the computer screen user interface, information identifying an authorized information seeker. The information seeker seeks access to a remote database via an internet protocol connection. An authorization confirmation display displays, via the computer screen user interface, that the authorized information seeker is confirmed as authorized to access the remote database. An access code request input requests, via the computer screen user interface, an access code for use by the authorized information seeker to access the remote database via the internet protocol connection. An access code output outputs the access code for use by the authorized information seeker.

BRIEF DESCRIPTION OF THE DRAWINGS

Embodiments will be described with reference to the following drawing figures, in which like numerals represent like items throughout the figures, and in which.

DETAILED DESCRIPTION

Sensitive data may be stored in various types of guarded databases, while a custodian is responsible for populating, updating, and guarding access to the sensitive data. Meanwhile, an information seeker may desire access to the sensitive data and may be authorized to obtain such access.

There is a need for tools to make it easier for information seekers to remotely access guarded databases. For example, medicine was traditionally a field driven by personal interaction and built on personal relationships. Doctors and other medical personnel knew the patient and his or her family, and thus, knew the persons to whom information on a patient's condition could be given.

As the field of medicine has become larger and more complex, an ever-increasing body of entities, such as insurance companies, commonly request and need medical information. Family members themselves are often geographically spread out, and not all family members may be known to the physicians and staff treating the patient. Medicine is still driven by interpersonal relationships, but more and more concern has been expressed about patient privacy and access to medical information.

In order to protect patients from unauthorized disclosure of their medical information, the U.S. Government has enacted a number of laws. One notable recent law in this area is the Health Insurance Portability and Accountability Act of 1996 (HIPAA). HIPAA places strict controls on the ability of physicians and medical staff to disclose medical information. While these controls may prevent disclosure of medical information, they can also have negative effects on the patient and his or her family.

For example, remotely located children or other relatives of a hospitalized parent may have no way of obtaining information on the parent's medical status. If a child or other relative calls the hospital, hospital personnel may be reluctant to disclose information, either because they cannot be certain of the caller's identity, or because the patient has not specifically identified the caller as an approved recipient of medical information. The problem is compounded when the child or other relative is located far from the hospital and cannot present him or herself in person to receive the desired information.

Figure 1:
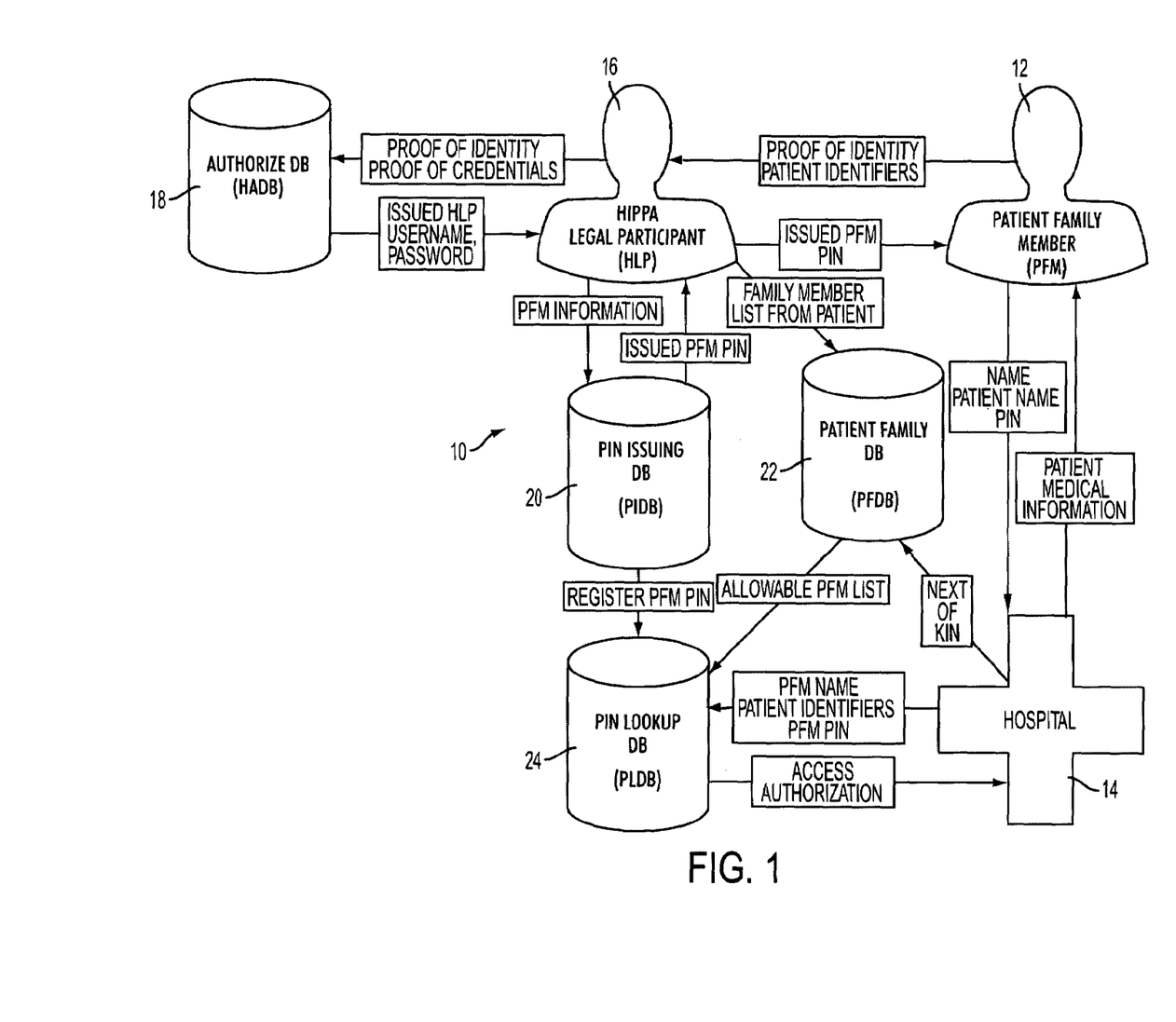
FIG. 1 is a block diagram of a system for remotely providing access to information according to an embodiment.

FIG. 1 is a block diagram of a system, generally indicated at 10, for HIPAA-compliant access to patient medical information by one or more patient family members (PFM) 12. In system 10, each PFM 12 is issued a unique personal identification number (PIN) that identifies the PFM 12 as authorized to request and obtain patient medical information. When a PFM 12 requests information about a patient's condition, he or she also supplies his or her PIN, which is verified by the staff of the hospital or other medical facility 14 before disclosing the requested information.

System 10 is a decentralized and uniform system for determining which family members or other individuals are authorized to access patient medical information. A medical facility 14 may collect next-of-kin data, and it may issue PINs directly to eligible family members who have been identified as authorized by the patient. In addition, trusted intermediaries, referred to as HIPAA Legal Participants (HLPs) 16, are provided and qualified to identify family members authorized to receive patient medical information and to issue PINs to those family members. As will be explained in greater detail below, an HLP 16 may be an attorney, a notary, or another individual with the knowledge, skills, and training required to authenticate a family member.

By allowing an HLP 16 to authenticate a PFM 12 and issue a PIN, assuming that the number of HLPs 16 is numerous, system 10 provides numerous ways in which a patient family member 12 might become authorized to obtain medical information about a patient, even if the family member 12 is far from the medical facility 14 and the staff of the medical facility cannot directly verify the identity of the family member.

As one example, assume that a person with several family members becomes ill. Furthermore, assume that some or all of the patient's family members do not live near the patient. Using system 10, the distant family members could go to an HLP 16, for example, the family attorney, a notary, or another such professional, provide identification and proof of a relationship with the ill relative, and be granted a PIN by the HLP 16. The medical facility 14 would validate and recognize the PIN, and would then provide any requested medical information to which the requester is entitled.

The illustrated system 10 comprises four databases: a HIPAA Legal Participant Authorization Database (HADB) 18, a PIN Issuing Database (PIDB) 20, a PIN Look-Up Database (PLDB) 24, and a Patient Family Database (PFDB) 22. In the illustrated embodiment of system 10, the databases 18, 20, 22, 24 are implemented with appropriate secure database software, and communicate with each other and with other elements of system 10 by an appropriate secure protocol and infrastructure, such as the secure hypertext transfer protocol (HTTPS) using the World Wide Web (WWW) infrastructure. Other types of networks and interface protocols may be used in alternate embodiments. For example, communication between the databases 18, 20, 22, 24 could also be accomplished by S/MIME or another secure e-mail protocol. Additionally, although four databases 18, 20, 22, 24 are shown in the illustrated embodiment of system 10, the functions of two or more of the databases 18, 20, 22, 24 may be combined as necessary or appropriate. The functions of a single database may also be distributed over several networked databases.

Of the databases, HADB 18 serves as a database and associated registration system containing records for each of the HLPs 18. Thus, a record in HADB 18 might contain the name and address of the HLP 16, the date of registration, indications of the qualifications of the HLP 16 and the manner in which identity and qualifications were proved, and the unique user name and password of the HLP 16 that are used in PIN issuing transactions. HADB 18 may be coupled to other registration and administration systems that are not shown in FIG. 1. The particular fields of information that are stored in the HADB 18 and its associated systems may be any fields necessary or desirable for registration of and control over the HLPs 16.

The particular qualifications required of the HLP 16 and/or the method of qualifying depend on the particular regulatory framework and law at the national and/or local levels. Although the HLP 16 is schematically shown in FIG. 1 as presenting his or her credentials to the HADB 18 for simplicity of illustration, in general, a prospective HLP would present his or her credentials to an arbitrator, certifying authority, or automated certifying system coupled to the HADB 18, and if the prospective HLP met the requirements, he or she would be entered into the HADB 18 and provided with a username and password that would allow the HLP 16 to access the PIDB 20 and PFDB 22.

Although a username and password are provided in the illustrated embodiment of system 10, other access identifiers could be used in alternate embodiments. For example, the HLP 16 could be provided with a digital certificate or public/private key set for use in accessing the system, which may be especially useful if communication with the databases is by S/MIME or another secure e-mail protocol.

The particular qualifications necessary to qualify as an HLP 16 and the form of the certifying or credentialing authority would be determined by local or national regulators; however, system 10 may be configured to accommodate HLPs 16 of different qualification levels. For example, if a prospective HLP is a notary, he or she might be required to take and pass an examination on the laws and procedures relevant to practice as an HLP 16. However, if a prospective HLP is an attorney, he or she might not be required to take and pass the same examination as a notary, or might not be required to take an examination at all. Information from the HADB 18 could also be used to administer continuing legal education or other periodic recertification programs, for example, by checking the date of registration of an HLP 16 against the indications of the credentials of the HLP 16 that may be stored in the HADB 18. Ancillary programs using information from the HADB 18 may be run on the same platform containing the HADB 18 or on different platforms, depending on the implementation.

As was noted above, the HLP 16 receives credentials, such as a username and password, to access the PIDB 20 and PFDB 22. Of those databases, the PIDB 20 is the database that directly administers the allocation and, when necessary, revocation of PINs. Information stored in the PIDB 20 may include an identifier of the PFM 12, the issued PIN number, and an identifier of the issuing HLP 16. The identifier of the PFM 12 in the PIDB 20 may be a link to the records of the PFDB 22, which would contain data such as fuller information on the PFM 12, including an identifier of the PFM 12, an identifier of the patient or patients whose medical information the PFM 12 is authorized to receive, and any indications as to the duration or restrictions on the authorization. As shown in FIG. 1, data in the PFDB 22 is generally supplied either by the medical facility 14 or by the HLP 16; the data in the PIDB 20 is generally supplied by the HLP 16, although in other embodiments, the medical facility 14 (e.g., an HLP 16 within the facility 14) may supply a PIN directly to a PFM 12.

Information from the PIDB 20 and PFDB 22 is brought together for end-user use by the PLDB 24. The PLDB 24 receives information on active PINs from the PIDB 20 and on PFMs 12 from the PFDB 22. The data from both databases 20, 22 is merged, related, or otherwise associated such that the records relating to PFM 12 access to patient medical information may be accessed by personnel of the medical facility 14 in order to authenticate PFM 12 requests for information. Access to the PLDB 24 may be logged and stored in the PLDB 24 or another system in order to provide a record of which PFMs 12 requested information, and specific medical facility users may have individual usernames and passwords or other credentials for accessing the PLDB 24.

Figure 2:
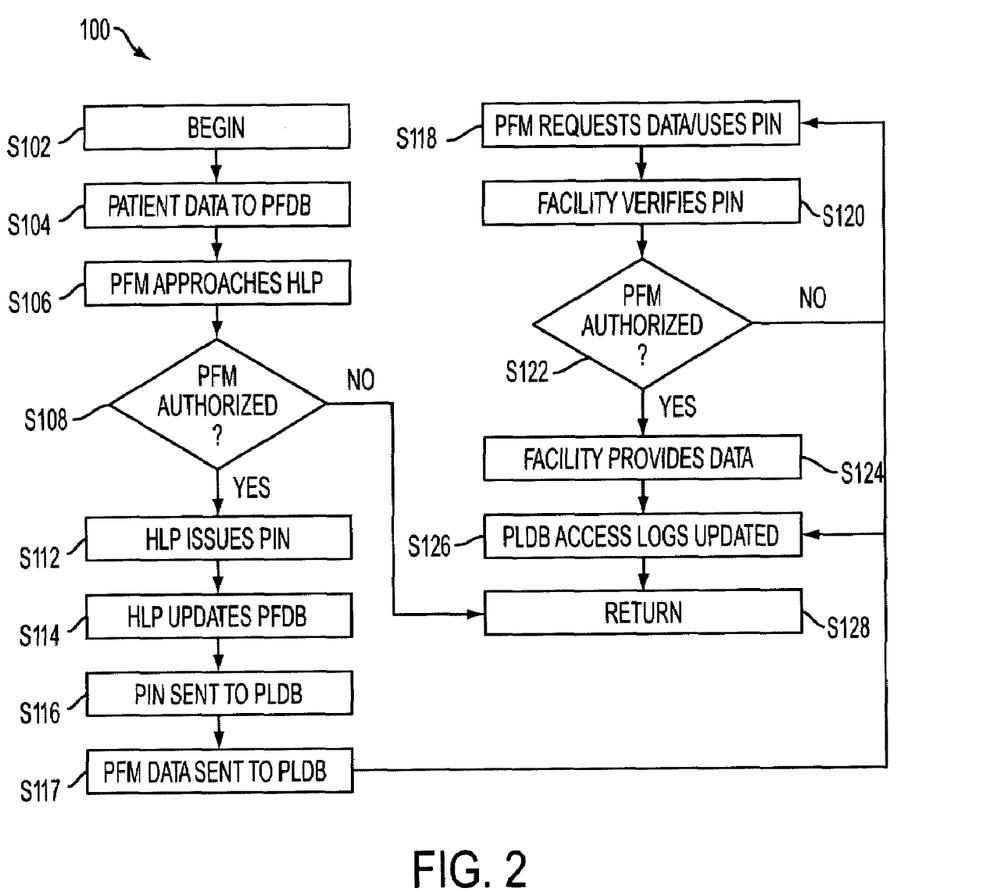
FIG. 2 is a flow diagram of an exemplary method by which the system of FIG. 1 may be used to access patient medical information.

An exemplary method 100 for using system 10 is shown in FIG. 2, a high-level flow diagram. Prior to the tasks of procedure 100, one or more HLPs 16 would be credentialed and entered into the HADB 18 using whatever procedures are determined to be necessary by the appropriate regulatory authorities. The medical facility 14 would also be registered as an authorized user of system 10 using appropriate procedures.

Method 100 begins at act 102 and continues with act 104. At act 104, the medical facility 14 (or, in some embodiments, the patient him or herself) provides next-of-kin and other family member information to the PFDB 22, specifying those individuals that can have access to the patient's medical information. This information is typically provided by the patient on admission or first visit forms. However, in exigent circumstances, no next-of-kin or other family member information may be available from the patient and act 104 may be omitted or may be provided in advance by the patient through the use of an HLP. At act 106, a PFM 12 becomes aware of his or her family member's illness and approaches an HLP 16 with appropriate identification and proof of relationship to obtain a PIN. The HLP 16 reviews the identification and proof of relationship offered by the PFM 12 and method 100 continues with act 108, in which the HLP 16 decides whether or not the PFM 12 is bona fide and is indeed a relative of the indicated patient. If the PFM 12 is bona fide (act 108:YES), the HLP 16 issues the PIN at act 112 by performing an appropriate transaction using the PIDB 20 (in accordance with the rules and guidelines of the applicable regulatory framework). If the PFM 12 is not bona fide in the view of the HLP 16 and should not be authorized to access the patient's medical records (act 108:NO), method 100 terminates and returns at act 128. With respect to act 106, the initial contact with an HLP 16 may also occur before a patient becomes ill, if illness or a need for a PIN is foreseen.

Once an HLP 16 has issued a PIN to a PFM 12, the HLP 16 also updates the PFDB 22 with appropriate information on the PFM at act 114. At act 116, the PIN is sent from the issuing PIDB 20 to the PLDB 24. At act 117, the PFM data entered by the HLP 16 is sent to the PLDB 24. (Acts 116 and 117 may be performed in any order or simultaneously. Alternatively, PIDB 20 and PFDB 22 could be polled for updates at regular intervals.)

The next portion of method 100 begins at act 118, when the PFM 12, having been issued a PIN, makes a request to the medical facility 14 for information on the patient's status. At that point, the medical facility 14 verifies the PIN at act 120 using the PLDB 24. If the PFM 12 is authorized (act 122: YES), the facility 14 provides the data at act 124. If the PFM 12 is not authorized (act 122:NO), the PLDB 24 logs are updated to reflect the improper access attempt at act 126 before method 100 completes at act 128. After the facility provides the requested data at act 124, the PLDB 24 access logs are also updated before method 100 ends at act 128.

As can be seen from method 100, one advantage of system 10 is that very few assumptions are made about the infrastructure or communications avenues available to the PFM 12. For example, the contact between the HLP 16 and the PFM 12 may be in person, and the PFM 12 may request information from the medical facility 14 by telephone, in person, or by any other suitable mechanism. Only the HLP 16 and the medical facility 14 are assumed to have secure database access. Such "off-band" communications between the PFM 12 and the other aspects of system 10, which require very little infrastructure and very little action on the part of the PFM 12, provide convenience for the PFM 12, particularly in exigent circumstances, while maintaining the security of system 10.

However, if more advanced communication infrastructure is available to the PFM 12, use of that infrastructure could be included in other embodiments of a system such as system 10. For example, if the PFM 12 has access to S/MIME or another form of secure e-mail, or has another form of identifying access code from a public access code infrastructure (PKI) encryption/authentication scheme, that key could be used to identify the PFM 12 to the HLP 16 by WWW or e-mail communication, such that a personal or other appearance was not required. The PFM 12 could then also use S/MIME, a key, or an authenticated HTTPS-capable web browser in electronic communications with the medical facility 14.

Although the example of system 10 and method 100 are described in terms of rights to access the records of a single patient, a PIN issued to a PFM 12 may link the PFM 12 to the records of multiple patients. Additionally, although the description has set forth family members as a particular category, PINs may be issued to other individuals with a need to know, such as a person with power of attorney to handle the affairs of another, or, in particular cases, emergency management and other government personnel. The group of individuals to whom PINs may be issued for any particular patient is limited only by the applicable regulatory scheme.

However, a PIN might not entitle a PFM 12 to complete access to a patient's records. For example, in some embodiments, a PIN might entitle a PFM 12 only to a general status indication, such as "critical," "critical but stable," "stable," or "good." In other embodiments, the PFM 12 might be able to access additional information, such as information on vital signs, any scheduled medical procedures, current medications, and prognosis.

The use of system 10 to qualify HLPs 16 and issue PINs to PFMs 12 has been set forth. However, system 10 also includes functions that allow HLP credentials and PINs to be revoked, either automatically or for cause. As was set forth above, the records in the PIDB 20 and the PLDB 24 may include an expiration date for the PIN, after which the PIN is automatically deactivated by the PIDB 20 and PLDB 24. Additionally, circumstances may arise in which the patient him or herself requests that the access rights of some or all family members be revoked. In that case, the medical facility 14 could request that the appropriate PINs be deactivated, by interaction with either the PFDB 22 or PLDB 24. A medical facility 14 would also have the discretion to deactivate a PIN if, in the judgment of the medical staff, the PIN is being abused or has been stolen. In most embodiments, deactivated PINs will be retained by the databases 20, 22, 24 in order to provide a record of who had access to information at any one time.

As with PINs, the credentials of HLPs 16 could be set to expire after a defined period of time, and could be deactivated after expiration of that time period. For example, if the credentials of an HLP 16, such as a notary commission, are set to expire on a particular date, the rights of the HLP 16 to issue PINs could also be set to expire on that date. In another embodiment, HLP credentials could expire every year, with recertification required for reinstatement. HLPs 16 are generally monitored by an accrediting association, such as a state bar. If that accrediting organization finds that the HLP 16 is no longer qualified to practice (for example, because of misconduct), the accrediting organization may also communicate with the HADB 18 to have the credentials of the HLP 16 revoked or deactivated. In general, although system 10 is not itself necessarily a public key infrastructure system, system 10 may share some features of public key infrastructures, which have a defined procedure for revoking credentials and certificates.

Middleware and other database support applications may be used as desired to provide convenient interfaces to the information supplied by system 10. For example, in some embodiments, if the patient's chart is kept electronically, an updated list of authorized PFMs 12 and their PINs could be pulled automatically from PLDB 24 and included in the patient's chart.

Figure 3:
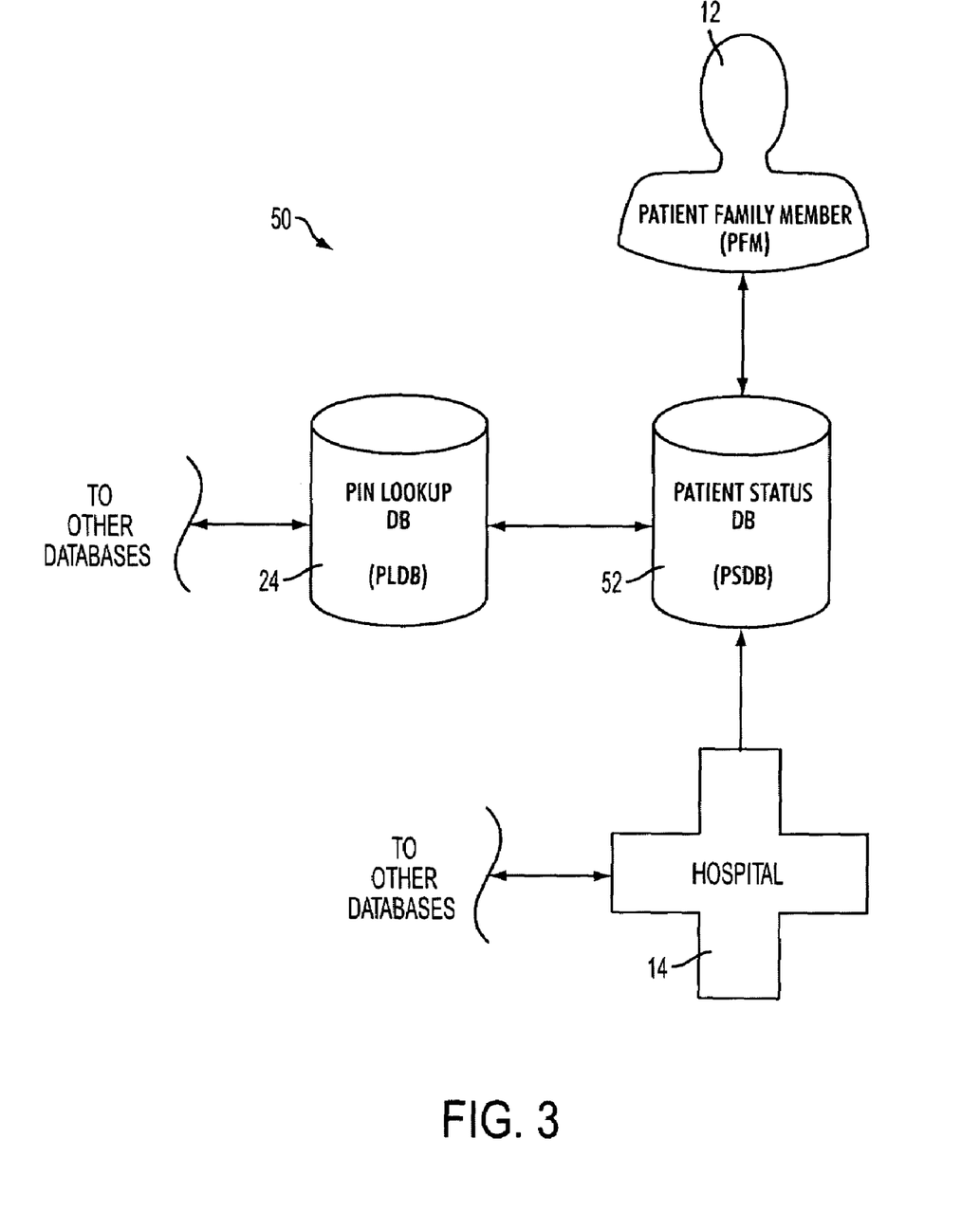
FIG. 3 is a block diagram of another embodiment of the system of FIG. 1, including a patient status database that may be accessed by family members.

FIG. 3 illustrates system 50, which is similar to system 10 and demonstrates an alternative way in which a PFM 12 might interface with the medical facility 14 to obtain medical information on a patient. In system 50, the medical facility 14 uses its information systems to regularly update a Patient Status Database (PSD) 52. The PFM 12 uses his or her PIN, along with the patient's identifying information, to interface with the PSD 52 using, for example, a World Wide Web browser client and accessing the PSD 52 using the HTTPS protocol. Access to the PSD 52 may also be by S/MIME or another secure communication mechanism.

Figure 4:
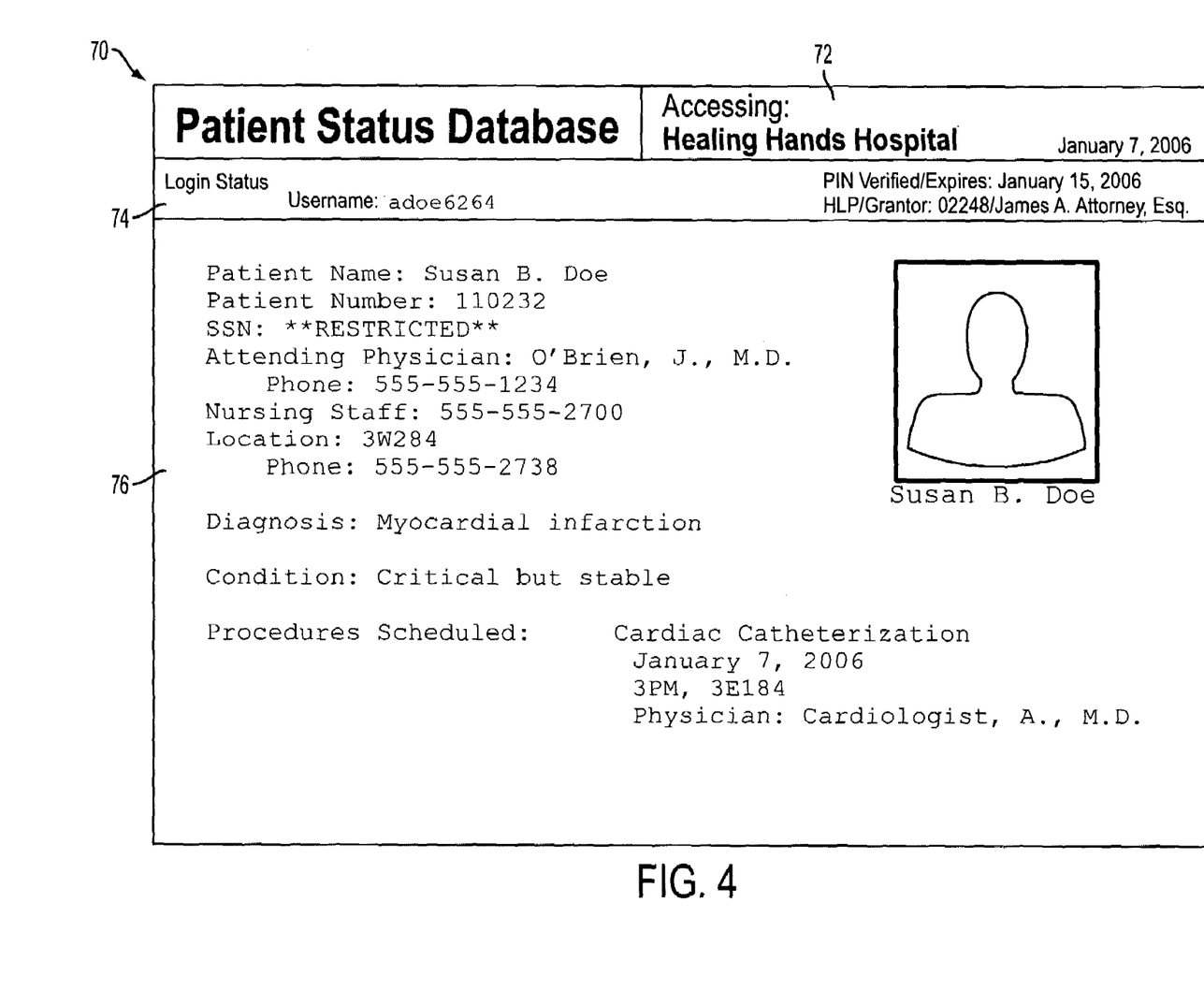
FIG. 4 is an illustration of a client interface to the patient status database of FIG. 3, showing the kinds of information that might be accessed by a family member.

FIG. 4 illustrates one example of the graphical portion of a World Wide Web browser-based secure interface 70 to PSD 52 in system 50. The data presented in interface 70 will vary from implementation to implementation, and may include any relevant data in PSD 52 or in other databases 18, 20, 22, 24 to which the PSD 52 is connected. In the illustrated example, interface 70 has a hospital identification portion 72, a user identification portion 74, and a patient information portion 76. The hospital identification portion 72 indicates which hospital's data is being accessed (in the illustrated case, "Healing Hands Hospital"). The user identification portion 74 identifies the username of the user accessing the database, and may provide other information about access rights. For example, in the illustrated embodiment, the user's PIN expiration date and the name of the granting HLP 16 are shown.

The patient information portion 76 contains information about the patient. The particular information provided will vary, depending on regulatory disclosure requirements, available information, and the access level or restrictions (if any) of the user who accesses the PSD 52. In the illustrated embodiment, the patient's name, number, attending physician and telephone number, nursing staff telephone number, location, and room phone number are provided. Also provided is basic information on the patient's condition, including the diagnosis, the patient's general condition, and information on any scheduled medical procedures. As shown in FIG. 4, the patient's diagnosis in this case is "myocardial infarction" and the patient is scheduled to undergo a cardiac catheterization, the time and place of which are given, along with the name of the physician performing the procedure. However, the patient information portion 76 of FIG. 4 shows that in the illustrated embodiment, the particular PFM 12 is denied access to the patient's social security number. In other embodiments, the PFM 12 may be denied or permitted access to other information.

Figure 5:
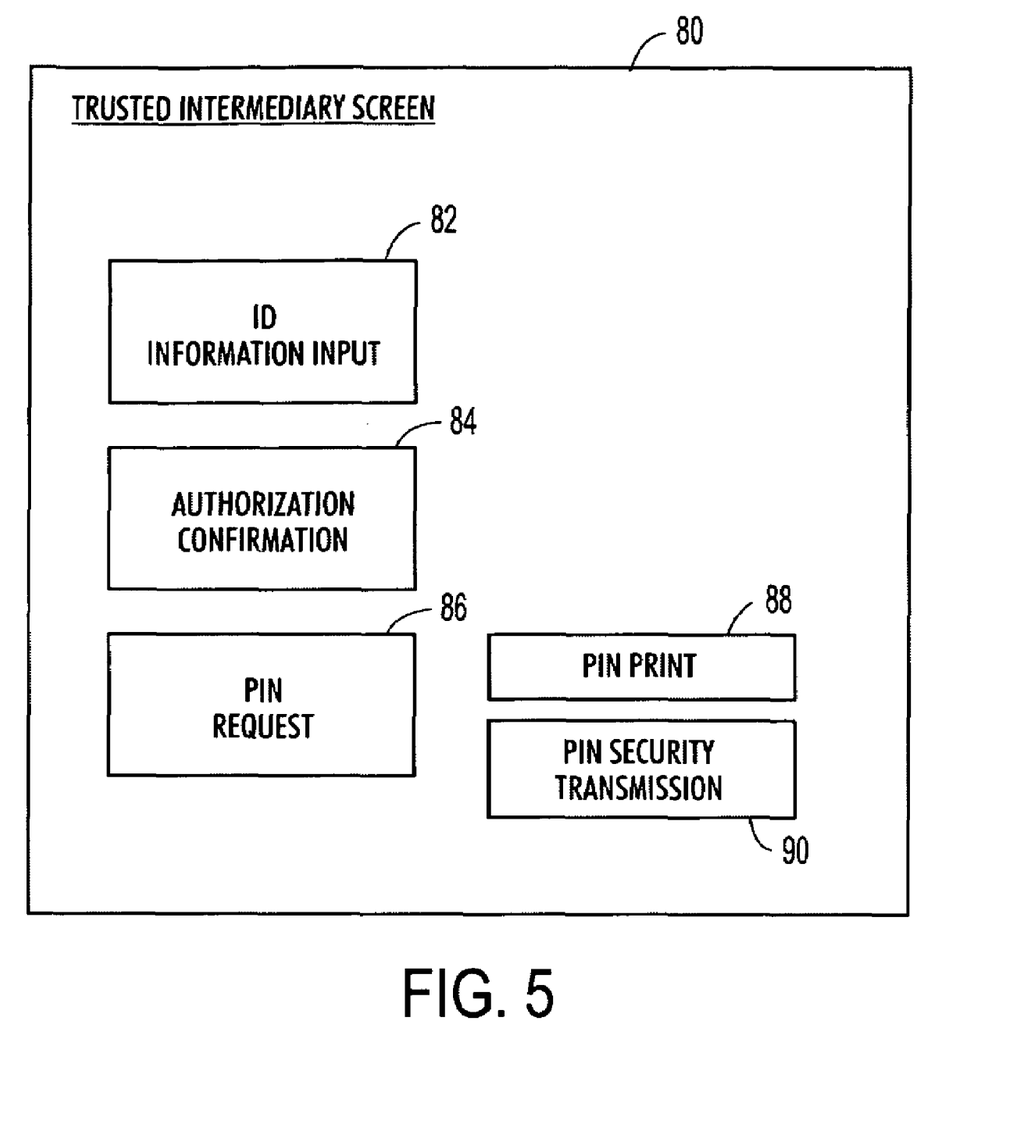
FIG. 5 shows a trusted intermediary screen.

FIG. 5 shows a user interface, specifically a trusted intermediary screen 80 in the illustrated embodiment. The trusted intermediary, in the embodiment, is a HIPAA Legal Participant (HLP). The illustrated screen 80 includes an ID information input graphical tool 82, for the input of ID information pertaining to a given patient family member (PFM) seeking access to patient information. An authorization confirmation graphical tool 84 indicates to the user whether he or she is authorized to provide a PIN to the requesting PFM. Once authorized, the PIN request graphical tool 86 becomes active, allowing the user to request a PIN for the given PFM. The issued PIN can be, for example, printed via a print graphical tool 88 and/or transmitted securely via a secure PIN transmission graphical tool 90.

A graphical tool may include, for example, an icon or button that can be activated by clicking a mouse with a curser situated over the icon or button. A graphical tool may include a form or textual input represented on a computer screen. A graphical tool may include a menu of displayed symbols or text that could be chosen by pointing to and clicking over a given symbol or text. The graphical tool can also include a drop down menu, or any other type of graphical tool. Alternatively, other tools may be provided to allow a user to control and operate any of the functions referred to in the interface shown in FIG. 5, e.g., with the use of a command line type interface.

Although portions of the foregoing have been described with reference to the HIPAA regulatory framework, systems and methods such as system 10 and method 100 may be adapted to and used with any framework that necessitates remote, distributed identity verification for access to information.

The claims, as originally presented and as they may be amended, encompass variations, alternatives, modifications, improvements, equivalents, and substantial equivalents of the embodiments and the teachings disclosed herein, including those that are presently unforeseen or unappreciated, and that, for example, may arise from applicants/patentees, and others.

What is claimed is:

1. Apparatus comprising:
   a trusted intermediary computer screen user interface, to which a given human trusted intermediary is given access upon presenting his or her trusted intermediary credentials to a trusted intermediary computer system including the trusted intermediary computer screen user interface, the given human trusted intermediary obtaining access to the trusted intermediary computer screen user interface upon being approached by a human authorized information seeker different than and independent from the given human trusted intermediary;
   an identification information input to receive, via the trusted intermediary interacting with the trusted intermediary computer screen user interface, information identifying an authorized information seeker seeking access to protected content, to which the information seeker is already authorized to access, the access being sought by the authorized information seeker being sought at a remote database via an internet protocol connection;
   an authorization confirmation display to display to the trusted intermediary, via the trusted intermediary computer screen user interface, that the authorized information seeker is confirmed as authorized to access the remote database;
   an access code request input to request, via the trusted intermediary interacting with the trusted intermediary computer screen user interface, an access code for use by the authorized information seeker to access the remote database via the internet protocol connection; and
   an access code output to output the access code for use by the authorized information seeker.

2. The apparatus according to claim 1, wherein the access code includes a PIN.

3. The apparatus according to claim 2, further comprising:
   a PIN requester to send a PIN request, via a PIN request internet protocol connection, to a remote PIN issuing database.

4. Apparatus comprising:
   a credential issuing system to provide to a trusted intermediary unique third party identifying credentials to issue to an authorized third party, the credential issuing system being accessible to a given human trusted intermediary upon presenting his or her trusted intermediary credentials to a trusted intermediary computer system, the given human trusted intermediary obtaining access to the credential issuing system upon being approached by a human authorized third party different than and independent from the given human trusted intermediary;
   a third party information system to maintain information on authorized third parties including the authorized third party; and
   a verification system to verify the identity of an authorized third party based on the third party identifying credentials, the verification system being configured to receive the third party identifying credentials via input by the given human trusted intermediary.

5. The apparatus of claim 4, further comprising an intermediary verification system to verify the credentials of the trusted intermediaries and to provide the trusted intermediaries with access to the credential issuing system.

6. The apparatus of claim 5, wherein the credential issuing system, the third party information system, the verification system, and the intermediary verification system comprise databases or portions thereof 7. The apparatus of claim 6, wherein the databases communicate securely.

8. The apparatus of claim 6, further comprising an information system containing the information, the information system being coupled to the verification system to disclose the information after verification of the third party identifying credentials, the information system having an interface that is securely accessible to the authorized third party using the third party identifying credentials.

9. The apparatus of claim 4, wherein the information is patient medical information.

10. The apparatus of claim 9, wherein the authorized third parties are family members of the patient.

11. Apparatus comprising:
    means for providing trusted intermediaries with unique identifying credentials to issue to an authorized third party after verification of the identity of the authorized third party, the unique identifying credentials enabling the authorized third party to access protected information, the means for providing trusted intermediaries with unique identifying credentials being accessible to a given human trusted intermediary upon presenting his or her trusted intermediary credentials to a trusted intermediary computer system, the given human trusted intermediary obtaining access to the credential issuing system upon being approached by a human authorized third party different than and independent from the given human trusted intermediary;
    means for storing and providing information on authorized third parties; and
    means for verifying the identifying credentials before providing the protected information, the means for verifying being configured to receive the third party identifying credentials via input by the given human trusted intermediary.

12. The apparatus of claim 11, further comprising means for managing information on the trusted intermediaries and for providing the trusted intermediaries with access to the means for providing credentials.

13. The apparatus of claim 12, wherein the trusted intermediary is a legal services provider.

14. The apparatus of claim 12, wherein the means for managing information on the trusted intermediaries, the means for providing credentials, the means for storing information on authorized third parties, and the means for verifying the identifying credentials comprise databases.

15. The apparatus of claim 14, further comprising:
    means for managing the protected information coupled to the means for verifying the identifying credentials and a medical facility, the means for managing the protected information being adapted to contain patient medical data provided by the medical facility; and
    means for presenting the protected information coupled to the means for managing protected information.

16. The apparatus of claim 12, further comprising means for providing the protected information via a computer screen viewable by one of the trusted intermediaries, wherein the authorized third party obtains identifying credentials by in-person contact with the one of the trusted intermediaries.

17. The apparatus of claim 12, further comprising means for providing the protected information electronically from a computer accessed by one of the trusted intermediaries, wherein the authorized third party obtains identifying credentials by secure electronic communication with the one of the trusted intermediaries.

18. A method comprising:
    a given human trusted intermediary verifying, upon being approached by a third party information requester already being entitled to access protected information including sensitive patient medical data, via a trusted intermediary computer system to which the given human trusted intermediary was given access upon presenting his or her trusted intermediary credentials to the trusted intermediary computer, both the identity of a third party information requester and the third party information requester's entitlement to the protected information, wherein the trusted intermediary computer system is configured to permit trusted intermediaries to have access to the trusted intermediary computer by requiring respective trusted intermediary credentials;
    the human trusted intermediary learning, from the trusted intermediary computer system, and issuing to the third party information requester unique identifying authorized third party credentials; and
    a health services provider different than the human trusted intermediary disclosing patient medical data to the third party information requester after the third party information requester has provided the unique identifying credentials to the health services provider.

19. The method of claim 18, further comprising, before allowing the trusted intermediary to verify the identity of a third party requester, establishing and verifying the credentials of the trusted intermediary.

20. The method of claim 18, wherein the protected information is patient medical information and the third party information requester is a patient family member.

21. The method of claim 18, wherein there are a plurality of trusted intermediaries.

22. The method of claim 18, wherein the trusted intermediary is a legal practitioner.

23. The method of claim 18, wherein the disclosing comprises in person disclosing, telephone disclosing, or disclosing by third party information requester access to an information system.

* * * * *